Jan. 16, 1934.    C. N. MITCHELL    1,943,545
STEERING WHEEL
Filed Nov. 21, 1929
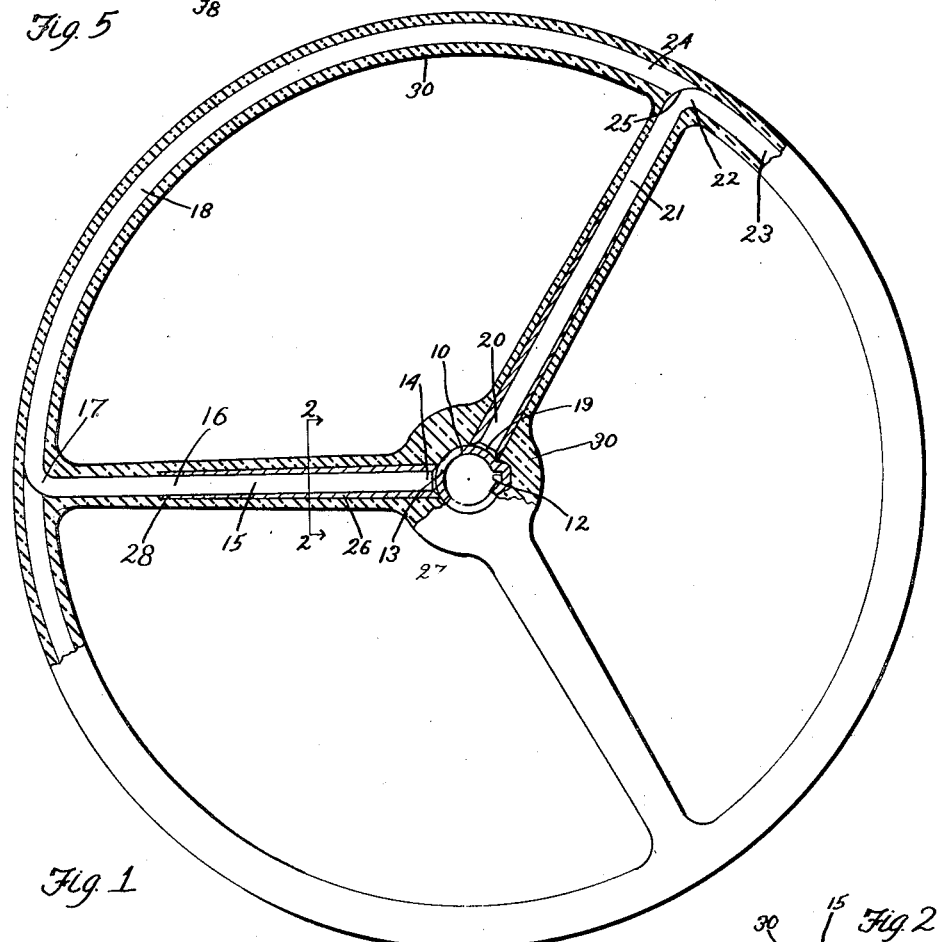
INVENTOR.
Courtney N. Mitchell
BY
Fay, Oberlin + Fay
ATTORNEYS.

Patented Jan. 16, 1934

1,943,545

UNITED STATES PATENT OFFICE 1,943,545

STEERING WHEEL

Courtney N. Mitchell, Cleveland Heights, Ohio, assignor to The J. & M. Machine Company, Cleveland, Ohio, a corporation of Ohio Application November 21, 1929
Serial No. 408,784

7 Claims. (Cl. 74—33)

The present application relates, as indicated, to steering wheels, and to a method of manufacturing the same. Among the objects of the invention is the economical production of a steering wheel which shall combine an unusual degree of visibility therethrough with sufficient strength to meet the requirements of the work to which the wheel is subjected, and an attractive appearance.

Fig. 1 is a plan view, partly in section, of a steering wheel constructed in accordance with my invention; Fig. 2 is a section taken substantially upon line 2—2 of Fig. 1; Fig. 3 is a vertical section through the wheel illustrated in Fig. 1; Fig. 4 is a fragmental vertical section of a wheel including a slight modification in structure; and Fig. 5 is a view similar to Fig. 4 but illustrating a further modification.

Referring more particularly to the drawing, it will be seen that I have provided a steering wheel including a hub 10, such hub being stamped from sheet metal, and being formed to provide a socket 11 at its lower end adapted to receive the tube of the steering column, and with a longitudinal key-way 12 in the wall of its bore.

At the point 13, there is spot welded to the peripheral surface of said hub 10 one end 14 of a cylindrical metallic rod 15, said rod being formed to provide a radially extending portion 16, and being bent at 17 to provide an arcuate portion 18. The portion 18 is of an extent to cover substantially 120° of the circumference of a circle.

The use of a stamped metal hub makes it possible to weld the rod 15 directly to the hub 10 by the resistance process, thus eliminating the drilling of the hub required in previous similar constructions.

At the point 19, 120° removed from the point 13, there is welded to the periphery of the hub 10, one end 20 of a rod 21, said rod 21 being bent at 22 to provide an arcuate portion 23 extending another 120° about the periphery of a circle. As is clearly shown in Fig. 1, the end 24 of the portion 18 of the rod 15 is radiused at 25 to fit closely against the bend 22 of the rod 21. A third rod (not shown) has its one end welded to the hub 10 at a point intermediate the points 13 and 19, and 120° removed from each of said points; and said last-mentioned rod is likewise arcuately bent to complete the circle. It will thus be seen that the arcuate portions of the three rods cooperate to form the rim of the steering wheel, and that the remaining portions of said rods form the spokes of said wheel.

It is sometimes found that, under particular circumstances, the small-section rods illustrated herein are subject to strain under the influence of a force applied normal to the plane of the wheel. Where it is desired, reinforcing means may be applied to said rods, and I have illustrated such reinforcing means. Such means may consist of channel-shaped members 26 gradually decreasing in thickness from their inner ends 27 to their outer ends 28. As is most clearly seen in Fig. 2, said members 26 are preferably so proportioned that their upper edges 29 extend above a substantially horizontal plane passed through the axis of the spoke, each of said members 26 being applied to the under side of its spoke. As will be obvious, the members 26 are adapted to be snapped onto the spokes.

If desired, the inner end 27 of each member 26 may be welded to the hub 10, and if desired, the members 26 may be welded at their opposite ends to the spokes; but, as will be obvious, said members 26 will exert a stiffening influence on the spokes whether or not they are welded, the material molded over the spokes and hub holding the reinforcements in non-slipping relation to the hub and the mass of the molded material forming a variable fulcrum for the spoke at a point where the reinforcement gives effective strength.

After the hub, spokes, and stiffening members have been assembled, the wheel as a whole is preferably coated with any desired substance, such as hard rubber, bakelite, or the like, such covering being illustrated at 30. Of course the primary object of the coating 30 is to give the wheel a finished and attractive appearance.

In Fig. 4, I have illustrated a modified structure adapted for use in that type of organization in which the hub of a wheel is received within the steering column tube. In this embodiment, the stamped hub 31 is formed in the wall of its bore with a key-way 32, and at its lower end with an outwardly projecting annular flange 33, said flange underlying and coinciding with a reduced extension 34 on the hub portion 35 of the coating 30, said flange and reduced extension being receivable in the steering column 2.

In Fig. 5 I have shown an embodiment including a hub 36 formed on a screw machine, said hub being formed with a keyway 37 in the wall of its bore, and with a socket 38 in its lower end adapted to receive the steering column tube. Portions 39 of the outer wall of said hub are cut away to localize the current used in resistance-welding the ends 40 of spokes to points 41 on the periphery of the hub 36.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A steering wheel comprising a hub, a plurality of spokes secured to the peripheral surface of said hub and extending radially therefrom, and a reinforcing member for each of said spokes, each of said reinforcing members comprising a channel-shaped element engaging the under side of one of said spokes and embracing the same.

2. A steering wheel comprising a hub, a plurality of spokes secured to the peripheral surface of said hub and extending radially therefrom, and a reinforcing member for each of said spokes, each of said reinforcing members comprising a channel-shaped element engaging the under side of one of said spokes and embracing the same, the thickness of each of said elements decreasing gradually from its inner end to its outer end.

3. A steering wheel comprising a stamped metal hub, a plurality of spokes welded to the peripheral surface of said hub and extending radially therefrom, each of said spokes comprising a metal rod of cylindrical cross-section, and a reinforcing member for each of said spokes, each of said reinforcing members comprising a channel-shaped element embracing more than 180° of the periphery of one of said spokes.

4. A steering wheel comprising a hub, a plurality of spokes secured to the peripheral surface of said hub and extending radially therefrom, and a reinforcing member for each of said spokes, each of said reinforcing members comprising a channel-shaped element engaging the under side of one of said spokes and embracing more than 180° of the periphery of the same.

5. A steering wheel comprising a hub, a plurality of spokes secured to the peripheral surface of said hub and extending radially therefrom, and a reinforcing member for each of said spokes, each of said reinforcing members comprising a channel-shaped element engaging the under side of one of said spokes and embracing more than 180° of the periphery of the same, the thickness of each of said elements decreasing gradually from its inner end to its outer end.

6. A steering wheel comprising a stamped metal hub, a plurality of spokes welded to the peripheral surface of said hub and extending radially therefrom, each of said spokes comprising a metal rod of cylindrical cross-section, and a reinforcing member for each of said spokes, each of said reinforcing members comprising a channel-shaped element welded at its one end to said hub, and embracing more than 180° of the periphery of one of said spokes.

7. A steering wheel comprising a stamped metal hub, a plurality of spokes welded to the peripheral surface of said hub and extending radially therefrom, each of said spokes comprising a metal rod of cylindrical cross-section, and a reinforcing member for each of said spokes, each of said reinforcing members comprising a channel-shaped element welded at its one end to said hub, and embracing more than 180° of the periphery of one of said spokes, the thickness of each of said reenforcing elements decreasing gradually from said end to the opposite end thereof.

COURTNEY N. MITCHELL.